(12) United States Patent
Van Oost et al.

(10) Patent No.: US 11,902,848 B2
(45) Date of Patent: *Feb. 13, 2024

(54) WLAN USER QUALITY OF EXPERIENCE CONTROL IN A MULTI-ACCESS POINT ENVIRONMENT

(71) Applicant: INTERDIGITAL CE PATENT HOLDINGS, Paris (FR)

(72) Inventors: Koen Van Oost, Borsbeek (BE); Bart Vercammen, Torhout (BE); Kevin Gardner, Duffel (BE)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,949

(22) Filed: Jun. 2, 2022

(65) Prior Publication Data

US 2022/0295371 A1   Sep. 15, 2022

Related U.S. Application Data

(63) Continuation of application No. 15/537,412, filed as application No. PCT/EP2015/079336 on Dec. 11, 2015, now Pat. No. 11,363,515.

(30) Foreign Application Priority Data

Dec. 17, 2014 (EP) .................................. 14307061

(51) Int. Cl.
*H04W 36/30* (2009.01)
*H04W 48/02* (2009.01)
(Continued)

(52) U.S. Cl.
CPC ........... *H04W 36/30* (2013.01); *H04W 24/08* (2013.01); *H04W 24/10* (2013.01);
(Continued)

(58) Field of Classification Search
CPC ..... H04W 36/30; H04W 76/15; H04W 24/08; H04W 24/10; H04W 28/0268; H04W 48/02; H04W 48/20; H04W 84/12
See application file for complete search history.

(56) References Cited

U.S. PATENT DOCUMENTS 8,014,355 B2   9/2011  Koga
8,041,335 B2  10/2011  Khetawat
(Continued)

FOREIGN PATENT DOCUMENTS

CN    1842038 A   10/2006
CN  101193042 A    6/2008
(Continued)

OTHER PUBLICATIONS

IEEE Standard for Information Technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2007 (Jun. 12, 2007).
(Continued)

*Primary Examiner* — Rhonda L Murphy
(74) *Attorney, Agent, or Firm* — Volpe Koenig

(57) ABSTRACT

A method (30) and system (10) for controlling wireless local area network (WLAN) user quality in a multi-access point environment is provided. In order to ensure good quality of service/user experience in a multi-access point Wi-Fi™ setup in which a user roams with a station (14), the access points (11, 12) continuously or at intervals assess the wireless environment's quality and report to a control entity (13). The control entity (13) determines, from the assessment data, alternative target access points (11, 12) that could be used in case the link quality of a current connection between an access point (11) and the station (14) falls below a pre-defined value. The control entity (13) then instructs the
(Continued)

access point (11) to actively disconnect the station (14) and selects a new target access point (12) to accept the stations (14) connection request.

8 Claims, 3 Drawing Sheets

(51) Int. Cl.
  *H04W 48/20* (2009.01)
  *H04W 76/15* (2018.01)
  *H04W 24/08* (2009.01)
  *H04W 24/10* (2009.01)
  *H04W 28/02* (2009.01)
  *H04W 84/12* (2009.01)

(52) U.S. Cl.
  CPC ....... *H04W 28/0268* (2013.01); *H04W 48/02* (2013.01); *H04W 48/20* (2013.01); *H04W 76/15* (2018.02); *H04W 84/12* (2013.01)

(56) References Cited

U.S. PATENT DOCUMENTS

| | | | |
|---|---|---|---|
| 9,553,897 B2 | 1/2017 | Chen et al. | |
| 9,930,526 B2 | 3/2018 | Huber et al. | |
| 2008/0320108 A1 | 12/2008 | Murty | |
| 2008/0320198 A1 | 12/2008 | Desai et al. | |
| 2012/0036557 A1* | 2/2012 | Li | H04W 12/08 |
| | | | 726/3 |
| 2013/0208589 A1 | 8/2013 | Lopez Toledo | |
| 2013/0244654 A1 | 9/2013 | Carmon et al. | |
| 2013/0272285 A1 | 10/2013 | Goldsmith et al. | |
| 2014/0036696 A1* | 2/2014 | Lee | H04W 76/15 |
| | | | 370/252 |
| 2014/0362776 A1 | 12/2014 | Tian et al. | |
| 2016/0050229 A1 | 2/2016 | Patel | |
| 2017/0142769 A1 | 5/2017 | Gilbert | |

FOREIGN PATENT DOCUMENTS

| | | | | |
|---|---|---|---|---|
| CN | 101340209 A | | 1/2009 | |
| CN | 101895962 A | | 11/2010 | |
| CN | 102027730 A | | 4/2011 | |
| CN | 102883301 A | | 1/2013 | |
| CN | 103856941 A | | 6/2014 | |
| EP | 2533573 A1 | * | 12/2012 | .......... H04W 36/385 |
| EP | 2533573 A1 | | 12/2012 | |
| JP | 2004007081 A | | 1/2004 | |
| JP | 2007201781 A | | 8/2007 | |
| JP | 2012054918 A | | 3/2012 | |
| JP | 2014179719 A | | 9/2014 | |
| JP | 2014236357 A | | 12/2014 | |
| KR | 1020130106325 A | | 9/2013 | |
| WO | 2008112255 A2 | | 9/2008 | |
| WO | 2013152305 A1 | | 10/2013 | |
| WO | 2014023337 A1 | | 2/2014 | |
| WO | 2014029870 A2 | | 2/2014 | |
| WO | 2014066403 A1 | | 5/2014 | |
| WO | 2014178707 A2 | | 11/2014 | |

OTHER PUBLICATIONS

Anonymous, "Alcatel-Lucent OmniAccess AP224/225", Icon Voice Networks, http://www.iconvoicenetworks.com/data-networking/alcatel-lucent-omniaccess-ap-224225/, Sep. 2014, pp. 1-3.
Anonymous, "Alcatel-Lucent Enterprise 4000 Series Controller", Alcatel-Lucent Enterprise Data Sheet, 2013, pp. 1-4.
Liu et al., "Energy Efficient Network Selection and Seamless Handovers in Mixed Networks", 2009 IEEE International Symposium on World of Wireless, Mobile and Multimedia Networks & Workshops, Kos, Greece, Jun. 15, 2009, pp. 1-9.
Sarma et al., "Context Aware Inter-BSS Handoff in IEEE 802.11 Networks: Efficient Resource Utilization and Performance Improvement", Wireless Personal Communication, vol. 77, No. 4, Aug. 2014, pp. 2587-2614. Abstract.
Choi et al., "QoS provisioning for large-scale multi-ap WLANs", Ad Hoc Networks, vol. 10, No. 2, Aug. 2010, pp. 174-185.

* cited by examiner

WLAN USER QUALITY OF EXPERIENCE CONTROL IN A MULTI-ACCESS POINT ENVIRONMENT

CROSS REFERENCE TO RELATED APPLICATIONS

This application is a continuation of U.S. patent application Ser. No. 15/537,412, filed Jun. 18, 2017, which claims the benefit under 35 U.S.C. § 371 of International Application PCT/EP2015/079336, filed Dec. 11, 2015, which was published in English in accordance with PCT Article 21(2) on Jun. 23, 2016, and which claims the benefit of European Patent Application 14307061.3, filed Dec. 17, 2014, which are incorporated by reference as if fully set forth.

TECHNICAL FIELD

The present invention generally relates to wireless local area network (WLAN) device management techniques and, more particularly, to a method and system for controlling WLAN user quality of experience in a multi-access point environment.

BACKGROUND

As quality of experience becomes a more stringent requirement on modern wireless local area networks (WLANs), it becomes rapidly clear that a single wireless access point (AP) is not able to deliver the full service set that is required by an end user. As a response, many WLANs are migrating to a multi-access point architecture. As a direct result of this trend, the industry started with the development of either WLAN repeater devices or simple access point nodes called extenders. Hence, WLAN is being reshaped from a strongly centralized architecture to a decentralized architecture where the combination of access point nodes form a backbone to ensure the high quality of experience level required. While the poor coverage issue might be handled that way, there is a wide variety of further issues with a decentralized architecture, which do not relate to signal strength or the lack thereof.

As more access points are installed in the home or professional environment, a new problem emerges that did not exist before. The new decentralized network architecture must now guarantee that each end user terminal device or WLAN client and, therefore, a station (STA), which is a device that has the capability to use the 802.11 protocol, receives the best quality of experience or user experience as a whole. Such a "function to ensure quality" does not exist in any current WLAN standard (IEEE (Institute of Electrical and Electronics Engineers) 802.11 or WFA (Wi-Fi™ Alliance)) and hence resides in vendor proprietary solutions.

On the professional side, the networks are generally managed based on a mix of internet protocol (IP) layer (L3) metrics (e.g. round trip delay, average throughput) and L2 metrics (e.g. packet loss, amount of users). An important aspect to be noted is that all management techniques are AP centric and roaming from one AP to another can still be independently controlled by the individual STAs without the AP interfering in that decision. As the "control"-function only uses L3/L2 metrics in combination with some simple WLAN metrics such as received signal strength indicator (RSSI) and/or physical layer (PHY) rate it is not able to detect specific WLAN anomalies such as hidden nodes or rogue radio frequency (RF) interference.

On the residential side, there is no quality control at all. STAs are roaming based on the simple implementation, which is currently embedded in the (open source) WLAN management code—"Wi-Fi™ protected access (WPA) supplicant"—namely an RSSI level based trigger to rescan the environment for a more "powerful" AP.

Sheer reception power (RSSI) is not a decent benchmark for signal quality, as will be acknowledged by persons skilled in the art of WLAN, the trigger condition to roam is wrong to say the least. This in combination with the inability for end users to modify the roaming behavior to a more clever mechanism leads currently to a more or less "best effort" approach of user experience control.

The patent application publication US 2013/0272285 A1 provides coordinating user equipment handover in a heterogeneous network cell that includes a plurality of overlaying cell layers. An access controller of a network core receives a first parameter relating to signal quality for the user equipment with a serving cell of a cell layer of the plurality of overlaying cell layers, and receives a second parameter based upon a velocity estimation of user equipment within the heterogeneous network cell. When the first parameter indicates a cell boundary, the access controller forms a handoff decision to a cell base station of a cell layer of the plurality of overlaying cell layers based upon the second parameter, and initiates a handoff to the cell base station based upon the handoff decision.

The patent application publication US 2013/0244654 A1 provides a method of managing Wi-Fi™ access points using a Wi-Fi™ network manager is disclosed. Measurement data is received from a plurality of Wi-Fi™ access points via a control interface. Optimized adjustments to one or more Wi-Fi™ parameters associated with one or more of the plurality of access points are searched based at least in part on a set of network optimization goals and the measurement data received from the plurality of access points. At least some of the optimized adjustments to the one or more Wi-Fi™ parameters are transmitted to the one or more of the plurality of access points using the control interface.

Current roaming decisions in multi-access point (AP) IEEE802.11 networks (Wi-Fi™) are made by each mobile device (STA) without knowledge of the infrastructure. The roaming decisions may result in poor roaming experience w/poor connection quality. A mechanism or method that controls the user experience or quality of service for each of the connected STAs individually is currently not available.

SUMMARY

With many WLANs migrating to a multi-access point architecture, a unified control function for all stations (STAs) rather than allowing each STA to make the roaming decision individually is becoming a key feature for solving above stated problems of the prior art. This unified control function should be based on link quality assessment rather than packet/frame counter based in combination with some uncorrelated physical layer (PHY) statistics to address current problems. In order to ensure a uniformly controlled quality of experience the individual access points should assess the environment and actual link quality in a first stage and communicate that information with a control entity and other access points in a second stage.

In order to ensure good quality of service/user experience in a multi-access point Wi-Fi™ setup in which a user roams with a mobile device (STA) the access points (APs) continuously or at intervals assess the wireless environment's quality (for example, noise, interference from other APs, traffic concentrated on individual APs, APs on the same channel) and report to a control entity. The control entity determines, from the assessment data, alternative "candidate" APs that could be used in case the link quality of a current connection between an AP and a STA falls below a predefined value. Assessment is done on Open Systems Interconnection (OSI) layers 1 and 2. The control entity then "primes" "candidate" APs to accept or reject a STA's connection request, e.g. by accordingly setting MAC filters (white listing or blacklisting). This effectively establishes a controlled roaming in multi-AP Wi-Fi™ networks that is fully compatible with legacy mobile devices and does not require any update of deployed mobile devices.

It is an advantage of embodiments of the invention that the real potential of a link is evaluated, rather than only the signal strength. Based on the real potential of the link and, thus the link quality or quality of user experience, respectively, roaming decisions may be forced compared to pure RSSI roaming to ensure that all stations (STAs) roam equally.

Accordingly, embodiments of the invention facilitate a satisfying WLAN experience to a user by forcing the station to connect with the best possible access point, based upon WLAN link quality measurements per station per access point. This experience is an improvement over the generally used best effort based mechanisms.

It is an advantage of embodiments of the invention that a relatively simple method for controlling the WLAN quality of service in a multi-access point environment is provided that gives handoff control to a control entity and is compatible with existing stations. No standard update for the stations is required. Embodiments of the invention will enable fast handoffs of about 100 to 200 ms.

According to embodiments of the present invention, a method for controlling wireless local area network (WLAN) user quality in a multi-access point environment is disclosed. The method comprises: establishing a wireless local area network system including a first access point (AP), a second access point, a control entity, and a station (STA), wherein a communication channel is established between the first access point and the second access point; connecting the station to the first access point; generating and publishing link quality reports to the control entity and to the second access point using the first access point; generating and publishing environment quality reports to the control entity and to the first access point using the second access point; blacklisting a media access control (MAC) address of the station via an access control list (MAC ACL) upon receiving consecutive unacceptable link quality reports and a quality alarm from the first access point with the control entity; instructing the first access point with the control entity to actively disconnect the station; determining a new target access point with the control entity based on the received environment quality reports; and connecting the station to the new target access point.

According to embodiments of the present invention, the method further includes forcing the station to roam for another access point by actively disconnecting the station from the first access point.

According to embodiments of the present invention, the method further includes calculating link quality scores with the control entity based on the link quality reports and environment quality reports.

According to embodiments of the present invention, the method further includes calculating the link quality scores based on values of a maximum physical layer (PHY) rate, a physical limits PHY rate, a trained TX PHY rate, a medium busy indicator, a total available throughput (power saving mode (PS) off), and available throughput (power saving mode (PS) on).

According to embodiments of the present invention, the method further includes comparing the link quality scores with a threshold that separates an acceptable link from an unacceptable link using the control entity, wherein the threshold is a configurable integer number threshold.

According to embodiments of the present invention, the method further includes integrating additional access points into the wireless local area network system; and instructing all non-eligible access points with the blacklisted a media access control (MAC) address using the control entity.

According to embodiments of the present invention, the method further includes instructing all access points eligible as the new target access point using the control entity to white list a media access control address; and enabling the station to be connected with one of these access points.

According to embodiments of the present invention, the method further includes holding the blacklist for at least a given time period; preventing a too frequent access point switch over; and removing the media access control (MAC) address of the station from the blacklist after expiration of the time period.

According to embodiments of the present invention, the method further includes generating and publishing link quality reports to the control entity and to the first access point using the second access point after connecting the station to the new target access point; and generating and publishing environment quality reports to the control entity and to the second access point using the first access point after connecting the station to the new target access point.

According to embodiments of the present invention, the method further includes using an active style link assessment to generate the link quality reports; launching a forced data connection with the access point the station is connected to; and sending layer 2 metrics data to the control entity.

According to embodiments of the present invention, the method further includes using a medium availability threshold set by the control entity on a link under test to trigger a more accurate diagnosis; forcing the link under test to be stressed; obtaining an overview of the losses due to interference, signal strength, and PHY layer anomalies; and linking real observed throughput to physical layer parameters using the control entity.

According to embodiments of the present invention, a wireless local area network (WLAN) system for controlling wireless local area network user quality in a multi-access point environment is disclosed. The system comprises a first access point (AP); a second access point, wherein a communication channel is established between the first access point and the second access point; a control entity in communication with the first access point and the second access point; wherein the first access point and the second access point generate and publish link quality reports or environment quality reports; and wherein the control entity calculates link quality scores based on the link quality reports and environment quality reports.

According to embodiments of the present invention, the system further includes a station (STA) in communication with the first access point and the second access point; wherein the first access point actively disconnects the station if the access point has a link quality score below a preset threshold and forces the station to roam for another access point having a link quality score above the threshold.

According to embodiments of the present invention, an access point otherwise compliant with the IEEE 802.11 standard additionally comprises software code to generate and publish link quality reports or environment quality reports to a control entity, to actively disconnect the station based on a command from the control entity.

According to embodiments of the present invention, a control entity otherwise compliant with the IEEE 802.11 standard comprises software code to calculate link quality scores based on the link quality reports and environment quality reports and to blacklist a media access control (MAC) address of a station via an access control list (MAC ACL) upon receiving consecutive unacceptable link quality reports and a quality alarm from an access point.

According to one or more embodiments of the present invention the control entity is integrated in a Wi-Fi™ router or access point.

BRIEF DESCRIPTION OF THE DRAWINGS

Embodiments of the invention are discussed in more detail below by way of example with reference to the drawings, in which.

Similar or same elements are referenced with the same reference numbers.

DESCRIPTION OF EMBODIMENTS

It will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo code, and the like represent various processes which may be substantially represented in computer readable storage media and so executed by a computer or processor, whether or not such computer or processor is explicitly shown.

Figure 1:
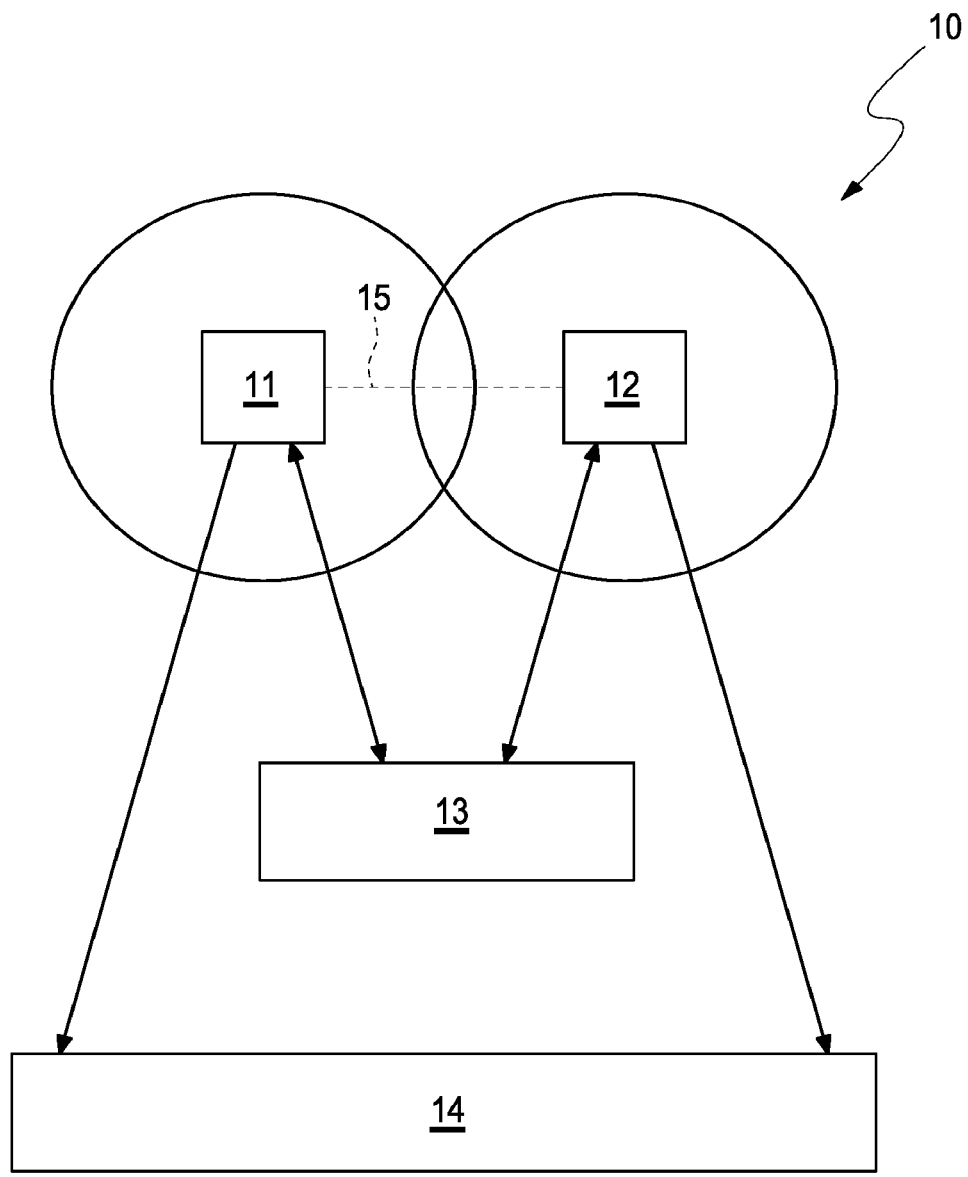
FIG. 1 shows a schematic diagram of a wireless local area network (WLAN) system in accordance with an embodiment of the present invention.

Referring to FIG. 1, a wireless local area network (WLAN) system 10 is illustrated according to an embodiment of the present invention. The WLAN system 10 may be a network that may include at least a first access point (AP) 11 and a second access point (AP) 12, a control entity 13, such as a WLAN controller unit, at least one station (STA) 14, such as an end user terminal device or WLAN client device, and a communication channel 15 between the first access point 11 and the second access point 12. Each of the access points 11 and 12 is capable of performing a link quality assessment. The control entity 13 may be integrated in one of the access points, for example the first access point 11 or the second access point 13. Each access point may be an access point according to the IEEE 802.11 standard. Each of the access points 11 and 12 could also be a home automation gateway (GWY). A unidirectional link may be established between each of the access points 11 and 12 and the station (STA) 14.

Figure 2:
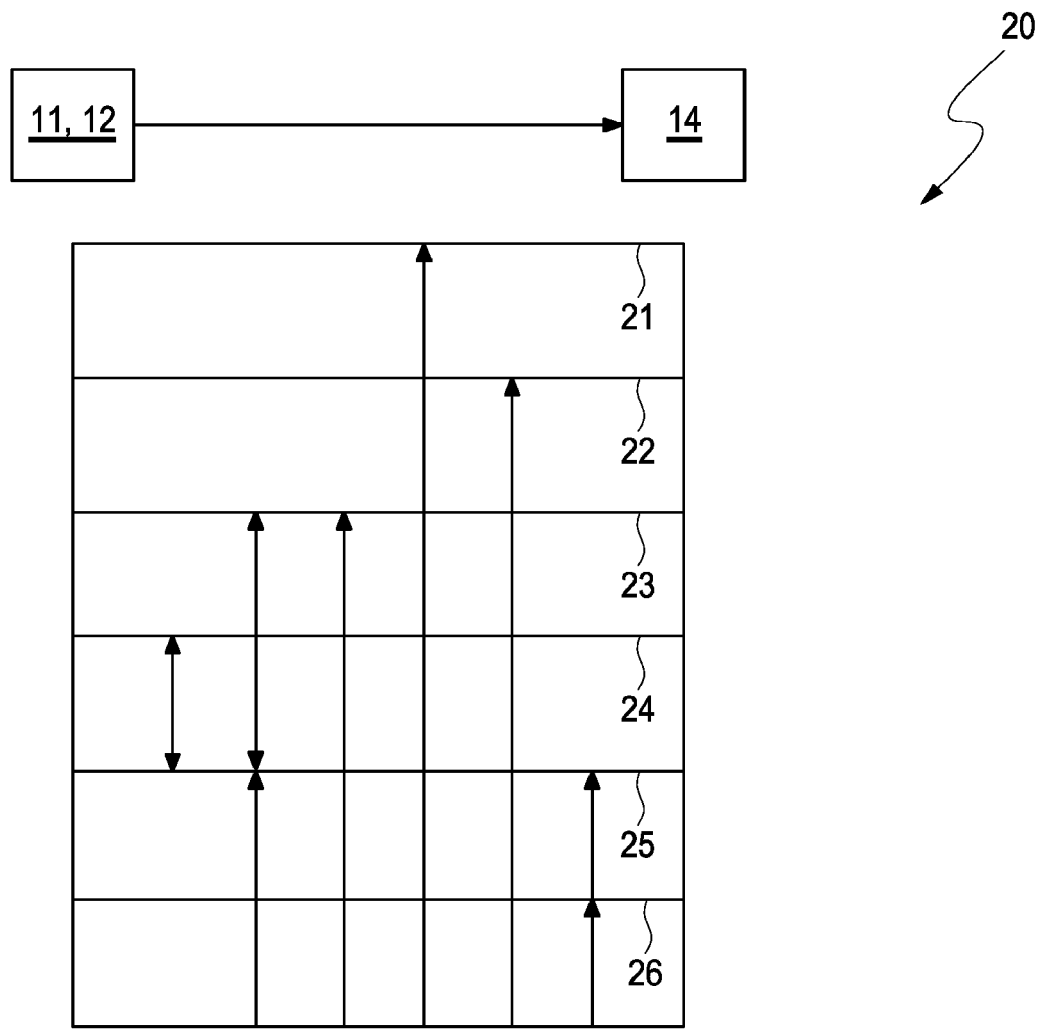
FIG. 2 shows a flowchart illustrating a link quality assessment method in accordance with an embodiment of the present invention.

Referring to FIG. 2, a link quality assessment method 20 is illustrated in accordance with an embodiment of the present invention. In order to ensure a uniformly controlled quality of experience the individual access points 11 and 12 should access the environment and actual link quality in a first stage and communicate that information with other the access points in a second stage.

Environment quality assessment does not require the presence of a client device, such as station (STA) 14 (as shown in FIG. 1) and is generally well understood. Each of the access points 11 and 12 can easily monitor various items including, for example, background noise level, medium availability due to "other WLAN devices", medium availability in general, medium availability due to traffic concentrated at the access point 11 or 12, and amount of other access points in the same channel. The environment quality assessment is a task that each access point, the first access point 11 and the second access point 12 as shown in FIG. 1, must execute in background and periodically report to the control entity 13. The control entity 13 then uses the environment quality assessment as "bias" to estimate which access points can be eligible to serve as "alternative" access point once a specific AP-STA link is determined to be bad.

Link quality assessment is a key component for validating the quality of a WLAN link. Link quality assessment can be implemented in several forms. An access point, such as access point 11 or access point 12, can evaluate the link quality either in a passive way or in an active way. While the active evaluation of the link quality results in the most accurate analysis, passive assessment serves the purpose to detect "trend line" error conditions, such as hidden nodes, non-WLAN noise, or WLAN medium sharing overload. The link quality assessment may be based on the performance of the actual link rather than the physical parameters such as signal strength or packet loss.

Based on the link quality assessment various link quality metric that may be expressed as a link quality score can be derived as visualized in FIG. 2 The link quality metric may be based on values of, for example, a maximum physical layer (PHY) rate 21, a physical limits PHY rate 22, a trained TX PHY rate 23, a medium busy indicator 24, a total available throughput (power saving mode (PS) off) 25, and available throughput (power saving mode (PS) on) 26. A total achieved throughput may be reflected in the link quality score.

The maximum PHY rate 21 is the PHY rate negotiated at association and, thus, the maximum achievable link speed. The physical limits PHY rate 22 is the maximum target PHY rate for a given amount received signal strength. The physical limits PHY rate 22 is thus the expected PHY rate based on a received signal strength indicator (RSSI) and may depend on the number of spatial streams. The trained TX PHY rate 23 is the PHY rate at which the transmission takes place, with TX referring to the physical medium that carries the signal. The medium busy indicator 24 refers to the amount of airtime that is lost due to sharing of the medium with other networks. The total available throughput (PS off) 25 is the maximum amount of available throughput based on the available airtime. The available throughput (PS on) 26 is the maximum available throughput based on the available airtime reduced with the recorded amount of time that the STA 14 is in a sleep mode due to power save. The total achieved throughput is the throughput that is generally achieved when using the active link.

Passive style link assessment can be combined with the environment quality assessment, as it will generally deliver similar statistics. The main difference is that the actual data traffic counters, which may include valid packets transmitted and the trained TX PHY rate 23, will be recorded based on the random data traffic that exists between the STA 14 and the AP 11 or 12 with which the STA 14 is connected. With this approach the determination of the total achieved throughput may be inaccurate as the active link is likely not to be used at its maximum throughput, additionally the trained TX PHY rate 23 can be off due to the fact that power saving techniques are pushing the PHY rate down as the STA 14 is not utilizing the WLAN link to its full potential. Passive monitoring data may be useful to build a "quality degradation alarm", which can trigger the control logic of the control entity 13 indicating that there might be a need to take action.

Active style link assessment is to some extend identical to the passive style link assessment but instead of calculating link metrics based on "random" data flows between the access point 11 or 12 and STA 14, the access point 11 or 12, to which the STA 14 is connected, will launch a forced data connection via which the access point 11 or 12 will try to send as much layer 2 (L2) metrics data (e.g. packet loss, amount of users) as possible. By doing so, the access point 11 or 12 will be able to determine an exact value for the trained TX PHY rate 23 and will further be able to determine the exact percentage of available throughput, trained TX PHY rate 23 and all other metrics listed previously and illustrated in FIG. 4. A medium availability threshold may be used on the active link to trigger a more accurate diagnosis, which forces the interface under test to be stressed. The outcome of this test is an overview of the losses due to interference, signal strength, PHY layer anomalies (e.g. fading). This way real observed throughput (and the lack thereof) is linked to PHY layer parameters.

For instance, if the signal strength is very high and there is a zero packet loss, the signal-to-interference-plus-noise ratio (SINR) is still acceptable and yet the link performance is nearly zero. This occurs due to a specific type of interference that cannot be represented by PHY layer counters as this a natural cause of the CSMA-CA (carrier sense multiple access with collision avoidance) protocol. By diagnosing an active link, useful parameters may be derived and used to decide whether or not to remove a client (STA) from a given access point (AP). Accordingly, a parameter that is related to a link quality or a metric based on quality of user experience, respectively, is used.

Each access point, such as the first access point 11 and the second access point 12, reports a link quality report periodically. When there is no STA 14 connected to the access point 11 or 12, the link quality report will be an environment quality report. The access point 11 or 12 should in any case report the full set of parameters 21 to 26 listed earlier.

Once a monitor period completes, the access point 11 or 12 sends the report, time stamped with an indication of an access point identifier (based on the basic service set identifier (BSSID) of the access point 11 or 12) to the control entity 13. The control entity 13, such as, for example, a WLAN controller, will then calculate a link score based on the obtained report and store the link score per access point 11 or 12 with a time stamp in its monitor table.

The described concept may not be limited to access points transmitting the full measurement report only. If an access point to access point link, such as a link between access point 11 and access point 12, is used, it can be beneficial to send an "alarm" signal only in case the access points are calculating the link score directly. In this case, the access points should report the failing link score only to the corresponding device that triggers it.

The control entity 13, for example a WLAN controller, may calculate a link quality metric expressed as a link quality score based on at least the following parameters: the maximum physical layer (PHY) rate 21, the trained TX PHY rate 23, the medium busy indicator 24, and a TZ time fraction. The link quality metric reflects the amount of performance that is lost due to loss of medium availability. The link quality metric is essentially equal to the environment quality assessment report, which is generated in case no connections with a STA 14 are present at the access point 11 or 12 performing the assessment. The link quality metric represents a scaled performance result. As such, the link quality metric and, thus, the link quality score, takes into account the actual obtained performance and the potential for improvement. The link quality score may be given as a number between 0% and 100%.

A threshold that separates a good/acceptable link from a bad/unacceptable link may be modeled as a configurable integer number threshold so that it can be easily adjusted to adapt the aggressiveness of the decision. For example, a good/acceptable link may have a link quality and, thus, a link score, of >40% and a bad/unacceptable link may have a link quality and, thus, a link score, of <40%. This way the control entity 13 can determine if an access point, such as access point 11 or access point 12, reports an acceptable or an unacceptable link quality.

Based on the periodical data that the control entity 13, such as a WLAN controller, receives from the access points 11 and 12, the control entity 13 can react on the time varying nature of WLAN quality or experience.

Figure 3:
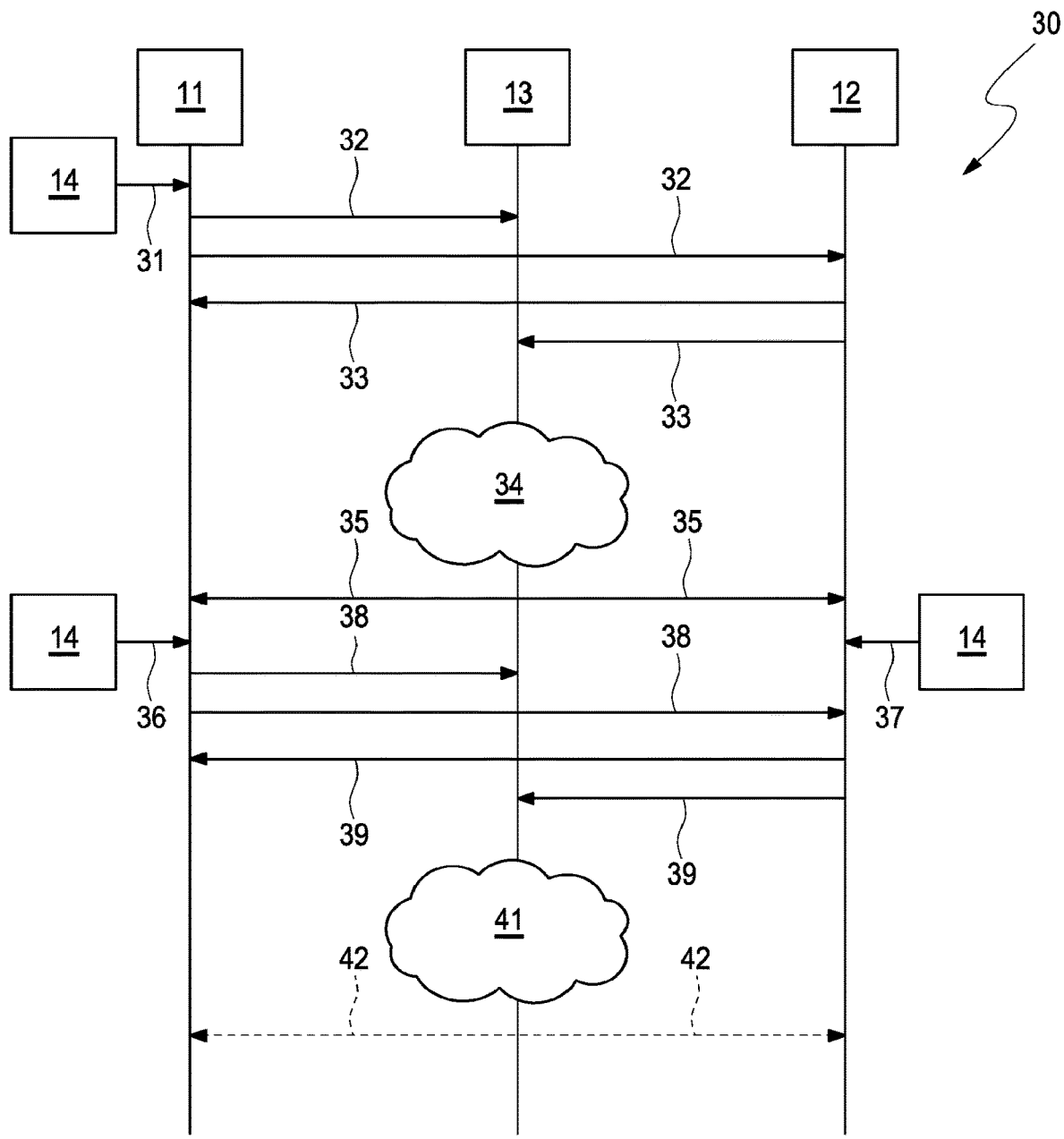
FIG. 3 shows a flowchart illustrating a WLAN user quality control in a multi-access point environment in accordance with an embodiment of the invention.

Referring now to FIG. 3, a WLAN user quality control algorithm 30 for a multi-access point environment is illustrated in accordance with an embodiment of the present invention.

The station (STA) 14 may be connected to the first access point 11 in a step 31. The access point 11 publishes link quality reports to the control entity 13 and to the second access point 12, to which the access point 11 is connected via the communication channel 15, in a step 32. Since no STA 14 is connected with the second access point 12, the second access point 12 publishes environment quality reports to the control entity 13 and to the first access point 11 in a step 33. The control entity 13 may use the link quality reports to calculate a link quality score and may compare the link quality score with a threshold that separates a good/acceptable link from a bad/unacceptable link, which may be modeled as a configurable integer number threshold, in a step 34. While only the first access point 11 and the second access point 12 are used as an example in FIG. 3, more than two access points may be present. Also more than the one station (STA) 14 may be present.

When the control entity 13 receives consecutive bad/unacceptable link quality reports and a quality alarm from the access point 11, the control entity 13 instructs the access point 11 to remove the STA 14 by blacklisting the STA MAC (media access control) address on the access point 11 via a simple access control list (MAC ACL), which may be an layer 2 active control list. The term consecutive may be modeled as an integer threshold to allow configuration of the aggressiveness of the controller's reaction.

Accordingly, the blacklist may be published by the control entity 13 in a step 35 to be received by the first access point 11 and the second access point 12. By publishing the black list, the access point 11 is instructed by the control entity 13 to actively disconnect the STA 14, for which the alarm was reported.

As a result, the STA 14 is immediately disconnected from the first access point 11 and forced to roam to find another access point in a step 36. The control entity 13 however does not allow the STA 14 to pick just any other access point. Instead, the control entity uses the environment quality reports and, thus, link quality scores, of the other access points to determine which access point would be the ideal candidate to host the new STA connection. In the case illustrated in FIG. 3, this is the second access point 12 and, thus, the STA 14 is connected with the second access point 12 in a step 37. Accordingly, the new target access point, here the second access point 12, will be determined based on an assessment of the operational environment of the individual access point, the access point 12.

All non-eligible access points may be instructed by the control entity 13 to apply the same STA MAC blacklist. A white list strategy may be applied on the new target access point, here the second access point 12 while all other access points, here the first access point 11, blacklist the STA MAC. The control entity 13 may instruct the new target access point 12 to whitelist the client MAC address and thus enable the STA 14 to be connected with the access point 12. This way the STA 14 cannot associate anywhere else but with the ideal target access point. This may be enabled by embedding pass/fail logic not only into the control entity 13 but also in the individual access points 11 and 12.

There may be requirement for the blacklist to be held for at least a given time period (e.g. 60 s) to prevent too frequent access point switch over as the STA's own roaming could trigger frequent jumps to other access points. However if the blacklists are held, the STA 14 learns that it cannot establish a connection and will stop trying.

After the STA 14 switched over from the first access point 11 to the second access point 12, the first access point 11 now publishes environment quality reports to the control entity 13 and to the second access point 12 in a step 38. The access point 12 publishes now link quality reports to the control entity 13 and to the first access point 11 in a step 39. Once the blacklist timeout expires, the control entity 13 will remove the blacklist state in a step 41. In a following step 42, the blacklist will be unpublished by the control entity 13.

As mentioned earlier, the basic system can utilize passive link quality assessment techniques. The overall architecture however allows a much broader application such as service based load balancing.

For example, the alarm conditions for the algorithm illustrated in FIG. 3 may have been configured to raise an alarm when the link quality score (or the link quality metric) drops below 60% for instance to raise frequent triggers. At this point, the control entity 13 can request the target access point 11 to perform an active style link assessment to figure out if the situation is unacceptable or if the target service (e.g. voice call or video streaming) can still be met. The access point 11 will then perform the active style link assessment and report the exact total achieved throughput to the control entity 13, which can then use this input to either remove other stations from the access point or move the target station, STA 14, to an access point, here the second access point 12, that is reporting 100% environment quality.

Various other applications can be built in a similar way due to the qualitative assessment in combination with the inter-access point communication mechanism that allows instructing access points to execute tests or take actions.

It is clear that the advantageous embodiments of the invention are not limited to music or other audio content. Movies or even games may be shared the same way as described above utilizing the mobile application in accordance with an embodiment of the invention.

REFERENCE SIGNS LIST

10 WLAN system
11 first access point (AP)
12 second access point (AP)
13 control entity
14 station (STA)
15 communication channel
20 link quality assessment method
21 maximum physical layer (PHY) rate
22 physical limits PHY rate
23 trained TX PHY rate
24 medium busy indicator
25 total available throughput (power saving mode (PS) off)
26 available throughput (power saving mode (PS) on)
30 WLAN user quality control algorithm for a multi-access point environment
31 method step
32 method step
33 method step
34 method step
35 method step
36 method step
37 method step
38 method step
39 method step
41 method step
42 method step

CITATION LIST

Patent Literature

1. US 2013/0244654 A1, Carmon et al., published Sep. 19, 2013
2. US 2013/0272285 A1, Goldsmith et al., published Oct. 17, 2013

The invention claimed is:

1. A method implemented in a control network element, the method comprising:
receiving link quality reports generated by a first access point, wherein a station is associated with the first access point;
receiving environment quality reports generated by one or more access points;
after receiving an alarm from the first access point, sending a first message to the first access point, the first message including information (i) indicating a media access control (MAC) address of the station to add in a list, wherein the list is used to reject a connection request from a listed station, (ii) instructing the first access point to maintain the MAC address of the station in the list for a first time period and to remove the MAC address of the station from the list after expiration of the first time period, and (iii) instructing the first access point to actively disconnect the station; and
sending a second message to a target access point, selected from the one or more access points based on the received environment quality reports, the second message indicating the MAC address of the station, wherein the indication is used to instruct the target access point to accept a connection request from the station.

2. The method of claim 1, wherein additional access points are detected, and a third message is sent to at least one detected additional access point, the third message indicating the MAC address of the station and instructing the at least one detected additional access point to reject a connection request from the station.

3. An apparatus comprising a memory and a processor configured to:
   receive link quality reports generated by a first access point, wherein a station is associated with the first access point;
   receive environment quality reports generated by one or more access points;
   after receiving an alarm from the first access point, send a first message to the first access point, the first message including information (i) indicating a media access control (MAC) address of the station to add in a list, wherein the list is used to reject a connection request from a listed station, (ii) instructing the first access point to maintain the MAC address of the station in the list for a first time period and to remove the MAC address of the station from the list after expiration of the first time period, and (iii) instructing the first access point to actively disconnect the station; and
   send a second message to a target access point, selected from the one or more access points based on the received environment quality reports, the second message indicating the MAC address of the station wherein the indication is used to instruct the target access point to accept a connection request from the station.

4. The apparatus of claim 3, wherein additional access points are detected, and a third message is sent to at least one detected additional access point, the third message indicating the MAC address of the station and instructing the at least one detected additional access point to reject a connection request from the station.

5. A method implemented in an access point, the method comprising:
   receiving link quality reports generated by a first access point, a station being associated with the first access point;
   receiving environment quality reports generated by one or more access points;
   generating own environment quality reports;
   after receiving an alarm from the first access point, sending a message to the first access point, the message including information (i) indicating a media access control (MAC) address of the station to add in a list, wherein the list is used to reject a connection request from a listed station, (ii) instructing the first access point to maintain the MAC address of the station in the list for a first time period and to remove the MAC address of the station from the list after expiration of the first time period, and (iii) instructing the first access point to actively disconnect the station; and
   accepting a connection request from the station to the access point, on a condition that the access point is selected from the access point and the one or more access points based on the received environment quality reports and the generated own environment quality report.

6. The method of claim 5, wherein additional access points are detected, and a third message is sent to at least one detected additional access point, the third message indicating the MAC address of the station and instructing the at least one detected additional access point to reject a connection request from the station.

7. An access point comprising a memory and a processor configured to:
   receive link quality reports generated by a first access point, a station being associated with the first access point;
   receive environment quality reports generated by one or more access points;
   generate own environment quality reports;
   after receiving an alarm from the first access point, send a message to the first access point, the message including information (i) indicating a media access control (MAC) address of the station to add in a list, wherein the list is used to reject a connection request from a listed station, (ii) instructing the first access point to maintain the MAC address of the station in the list for a first time period and to remove the MAC address of the station from the list after expiration of the first time period, and (iii) instructing the first access point to actively disconnect the station; and
   accept a connection request from the station (14) to the access point, on a condition that the access point is selected from the access point and the one or more access points based on the received environment quality reports and the generated own environment quality report.

8. The access point of claim 7, wherein additional access points are detected, and a third message is sent to at least one detected additional access point, the third message indicating the MAC address of the station and instructing the at least one detected additional access point to reject a connection request from the station.

* * * * *